Dec. 31, 1963  H. F. CLARK  3,116,397
THERMALLY RESPONSIVE CONTROL DEVICE FOR
A SURFACE COOKING UNIT
Filed March 24, 1961  2 Sheets-Sheet 1

INVENTOR.
Harry F. Clark
BY
Frederick M. Ritchie
His Attorney

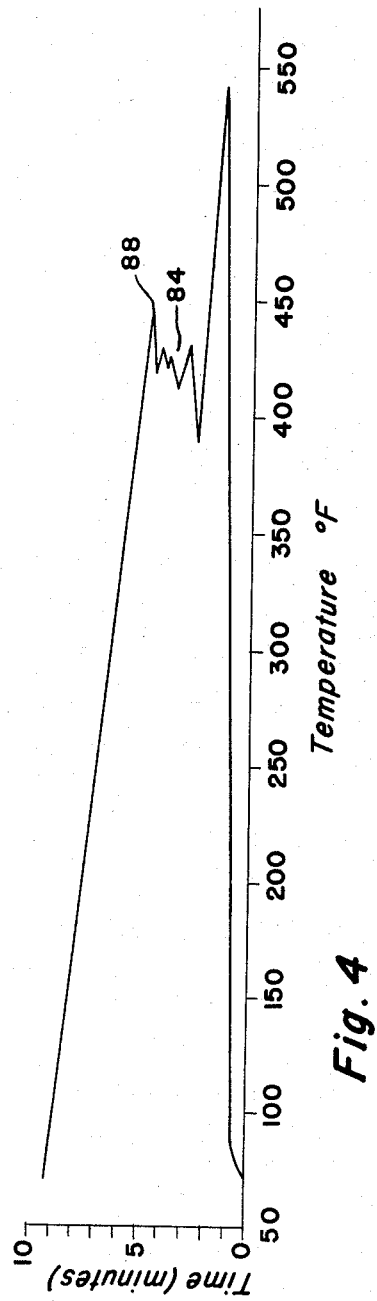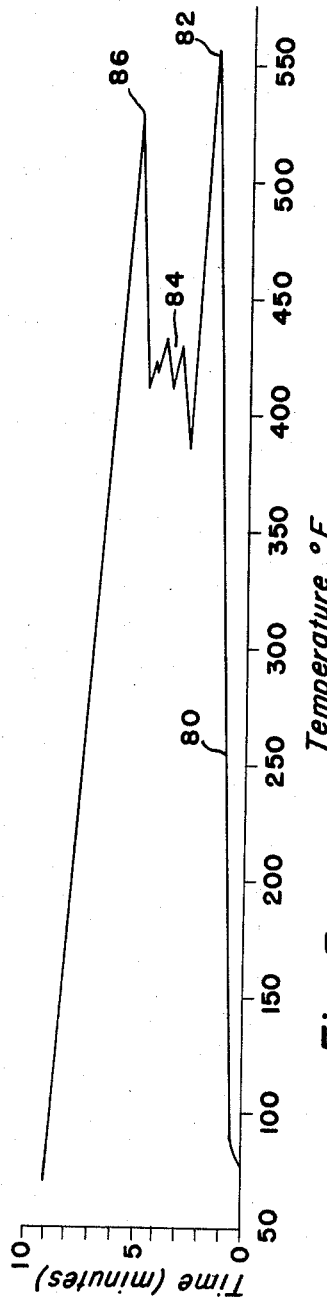

United States Patent Office 3,116,397
Patented Dec. 31, 1963

3,116,397
THERMALLY RESPONSIVE CONTROL DEVICE
FOR A SURFACE COOKING UNIT
Harry F. Clark, Dayton, Ohio, assignor to General
Motors Corporation, Detroit, Mich., a corporation of
Delaware
Filed Mar. 24, 1961, Ser. No. 98,256
8 Claims. (Cl. 219—20)

This invention relates to a domestic appliance and more particularly to an improved thermally responsive control device for a surface cooking unit on an electric range.

On currently marketed electric ranges there is generally found at least one cooking unit or surface heating element for which the power supply is pulsed on and off in accordance with a sensed temperature at the bottom of a utensil on the heating element. These temperature sensitive systems are generally quite reliable and operate quite accurately to control the temperature of a cooking process. However, occasionally there results a situation in which the sensing circuit of the control malfunctions and fails to signal an interruption to the power supply when the selected cooking temperature is attained. The heating element will remain energized continuously, thereby raising the possibility of dangerous overheating at the range. It is to the solution of this problem that the present invention is directed.

Accordingly, it is an object of this invention to provide a temperature responsive control system for a heating element which will always fail safe.

A more specific object of this invention is the provision of a balanced bridge circuit in a temperature responsive control system for a heating element in which a balanced bridge condition indicates proper circuit operation and an unbalanced bridge serves to interrupt power to the heating element.

Further objects and advantages of the present invention will be apparent from the following description, reference being had to the accompanying drawings wherein preferred embodiments of the present invention are clearly shown.

In the drawings:

FIGURE 3 is a graphic representation of the fail-safe improvement of this invention applied to one type of malfunction in a temperature sensing system; and FIGURE 4 is a graphic representation similar to FIGURE 3 as applied to another type of malfunction.

Figure 1:
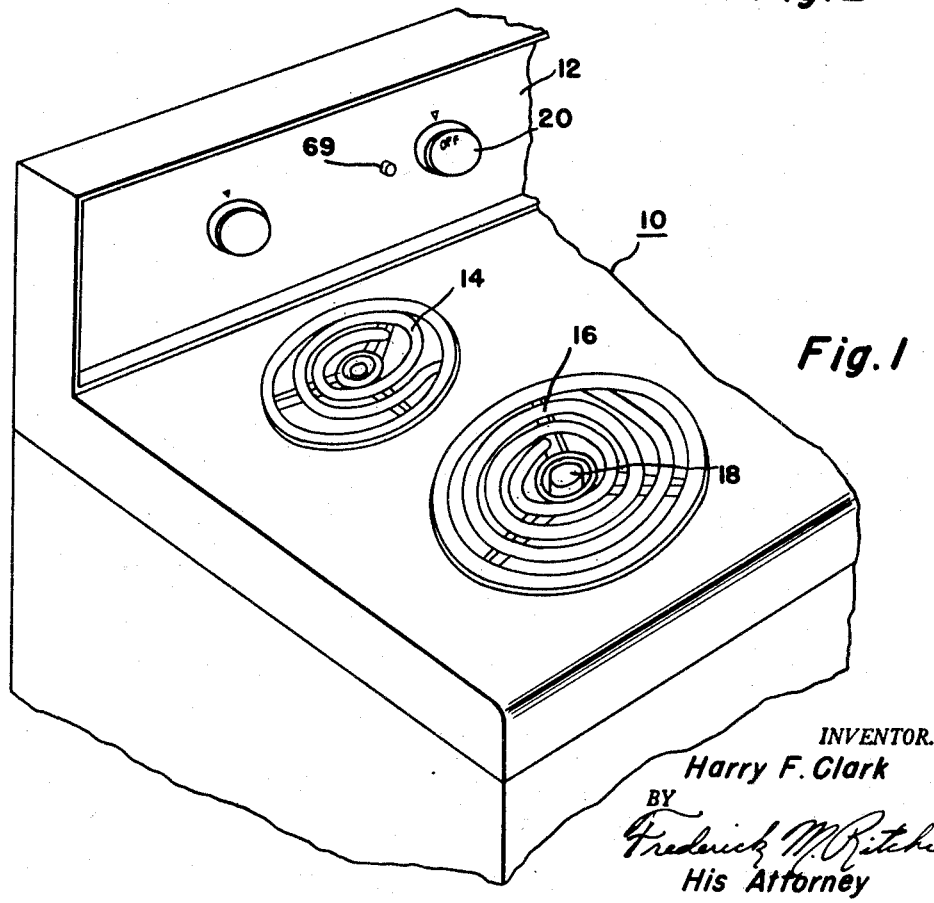
FIGURE 1 is a fragmentary perspective view of an electric range suitable for use with this invention.

In accordance with this invention and with reference to FIGURE 1, an electric range 10 is illustrated having a control console and a pair of surface heating elements 14 and 16. The surface heating element or cooking unit 16 is of an eight-inch, 2600-watt type generally used to provide a temperature controlled cooking operation for any utensil or workpiece placed on the top of the heating element. For this purpose, a temperature sensing head 18 is spring-biased upwardly in the center of the heating element to engage the bottom of any cooking utensil resting on the heating element. For controlling the heating element 16 a switch knob 20 may be positioned on the range console and adapted to be rotated from an "OFF" position throughout a number of temperature settings as the knob is rotated.

Figure 2:
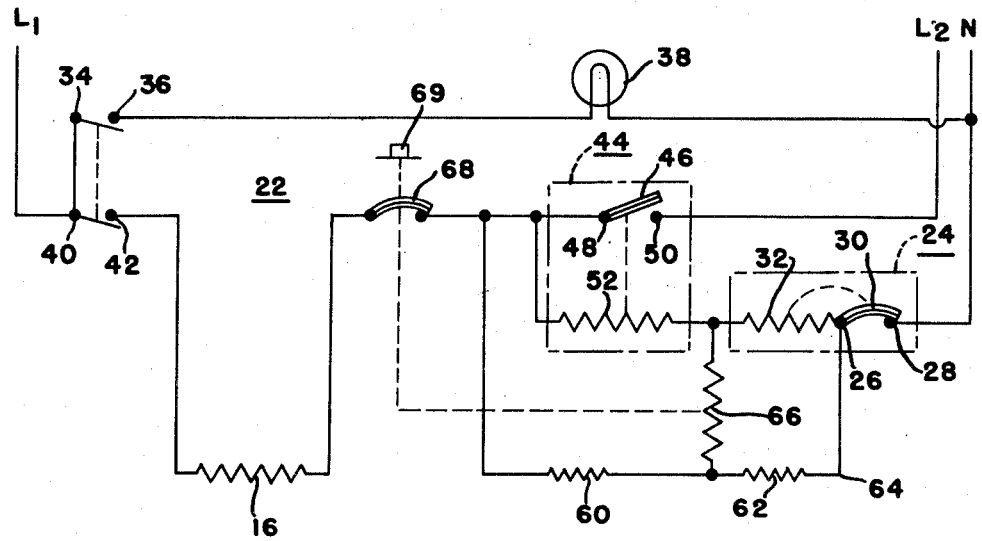
FIGURE 2 is a schematic wiring diagram of this invention.

The temperature sensitive control system to which this invention applies is a bimetal actuated type including two basic parts, a switch assembly 22 and a sensing unit 24 (see FIGURE 2). The switch assembly may be mounted in the control console 12 of the range to permit selection of cooking temperatures remote from the cooking unit.

The sensing unit 24, including the sensing head or cap 18, is a control device mounted in the center of the surface unit 16 so that the spring mounted cap 18 is self-aligning with the bottom of the cooking utensil. As its name implies, this unit senses actual utensil temperature and acts as a thermostat by opening and closing a set of bimetal actuated, normally closed contacts 26, 28. A bimetal 30 acts as a switch blade to open and close these contacts 26, 28 and is thermally actuated by a heater or actuator 32 in the sensing head.

The switch assembly 22 contains two pairs of contacts—a set of contacts 34, 36 for energizing and deenergizing a pilot lamp 38 in an indicator circuit, and a set of contacts 40, 42 for conditioning the surface heating element circuit for energization. Further, the switch assembly includes a cycler or pulser 44 consisting of a bimetal 46, a set of contacts 48, 50 and an auxiliary heater or actuator 52 which receives its signals or power pulses from the sensing unit 24. The contacts 48, 50 are normally closed when the switch knob 20 is turned on to close switch contacts 40, 42. Contacts 36, 42 and 50 are held open mechanically in the OFF switch position.

Both the switch assembly 22 and the sensor 24 may be replaced independently if damaged or failure of either part occurs. The temperature sensing circuit including the sensor heater 32, the cycler heater 52 and the bimetal 30 operates on 118 volts. The contacts 48, 50 in the cycler, on the other hand, cycle the full 2600 watts of the surface element 16 at 236 volts.

In operation, rotation of the switch knob 20 from the "OFF" position closes line contacts 40, 42, pilot lamp contacts 34, 36 and also operates an internal mechanical camming adjustment (not shown) for biasing the bimetal 46 in accordance with a predetermined temperature selection.

More particularly with reference to the sensor 24, the heater 32 is fine wire wrapped around the bimetal 30 to serve as an actuator for the bimetal—the bimetal warping to open the contacts 26, 28 in response to both the temperature sensed at the bottom of the utensil and the heating effect of the resistance wire 32 on the bimetal. This sensing unit heater or actuator 32 has a resistance of 525 ohms and passes a current of approximately 0.105 ampere at a normal line voltage of 118 volts. Actual voltage drop across the heater 32 will be approximately 55 volts.

In the cycler switch or pulser the 600 ohm heater 52 is energized intermittently with the cycling of the sensing unit contacts 26, 28. The current of 0.105 ampere at normal line voltage of 118 volts sets up an actual voltage drop across the heater 52 of 63 volts.

When a utensil is placed on the surface unit 16 and the switch knob 20 is turned on to any desired temperature on the indicator dial, the switch contacts 36, 42 and 50 are closed by their respective switch blades. The surface unit draws full wattage at 236 volts. As the temperature of the utensil increases, the sensing unit contacts 26, 28 remain closed to continuously energize the heater 32. In actual practice an additional bimetal (not shown) is welded to the sensing cap and adapted to act as a heat anticipator for the temperature sensing circuit by manipulating a toggle arrangement connected to one of the contacts 26 or 28. However, for the purpose of this invention a single bimetal 30 actuated by an auxiliary heater 32 is believed to simplify and clarify the explanation.

Completion of the circuit through contacts 26, 28 energizes heaters 52 and 32. Heater 52 causes the bimetal 46 within the cycler switch to move or warp, permitting contact 50 to open, thereby virtually stopping the flow of current to the surface unit 16. Likewise, heat from the heater 32 moves the sensing unit bimetal 30 in the direction to permit the contacts 26, 28 to open by means of toggle or snap action. In effect, a continuous cycling action occurs to give a balancing or compensating effect at the sensing unit to provide a close control of utensil temperature. Bimetal 30 also compensates for increased temperatures in the area around the surface unit.

As may be seen in the circuit diagram of FIGURE 2, it is possible for either the sensing unit cycler 24 or the switch cycler 44 to function independently of each other.

When a heated utensil and load are replaced by a cold load, fast recovery is possible since the sensing unit contacts 26, 28 open when the cap 18 is chilled and the switch contacts 48, 50 close shortly thereafter because heater 52 is no longer energized. As aforesaid, the contacts 48, 50 are normally closed when heater 52 is not energized. Thus, 2600 watts of energy are supplied intermittently and for appropriately longer intervals to the surface unit until the temperature adjustment is satisfactory.

The aforementioned circuitry is conventional and is in use in temperature responsive systems in many of today's ranges. However, it is possible that one or the other of the wires constituting the cycler heater 52 or the sensor heater 32 may be broken. In prior art devices, such a malfunction would cause the bimetal 46 to remain permanently closed on the contact 50 and the surface heating element 16 would be energized continuously on 236 volts. It is thus a purpose of this invention to provide a fail-safe system for the disclosed temperature control arrangement such that any malfunction will automatically de-energize the surface heating element 16 and prevent dangerous temperature overshoot at the surface heating element 16.

With reference to FIGURE 2, it will be noted that two additional resistors or heaters 60, 62 have been added to a protector circuit 64 in parallel with the cycler heater 52 and sensor heater 32. In addition, a protector heater 66 is added between the parallel circuits to form the cross link in an electrical bridge and adapted to actuate a protector switch bimetal 68 in the power supply to the cooking unit 16. Thus, the fail-safe components may include a simple bimetallic trigger-type protector 68 with a 1000-ohm, 1-watt resistor or heater 66. A manual reset 69 may also be provided for reclosing the switch 68 after the malfunction is corrected. The size of the resistors 60 and 62 is such as to balance the ratio of the heaters 52 and 32. Thus, the heater 60 is 570 ohms, while the heater 62 is 500 ohms. Both are 5-watt resistors. Since the ohm ratio of heater 60 to heater 62 is 570 to 500, this balances the ohm ratio of heaters 52 to 32 which is 600 to 525. The foregoing establishes a balanced bridge circuit wherein the heater 66 is substantially deenergized whenever the circuit is balanced. However, should either heater 32 or 52 be opened, the bridge circuit will be unbalanced, current will flow through the heater 66 and the bimetal switch 68 will be opened to interrupt current flow to the surface heating element 16.

Turning now to the graphic representation in FIGURE 3, the operation of the device will be explained in connection with an interruption or breakage of the heater 52. FIGURE 3 represents the control knob 20 as turned to approximately the 425° setting, the surface heating element 16 will start heating up along the curve 80. An initial overshoot 82 is provided to bring the ingredients in any utensil quickly to the predetermined temperature. Then in the cycling range 84, the cycler switch 46 is opened and closed repeatedly to maintain the predetermined temperature selection. Assume now that the cycler heater 52 breaks and unbalances the bridge circuit, power will then flow from the neutral N through the bimetal 30 to a pair of parallel paths, one of which includes the heater 32 and the heater 66, and then through the bridge heater 60 and the heating element 16 to the other side of the line $L_1$. As the heater 66 heats up, the bimetal 68 will be actuated or tripped thereby into an open position at a point 86 on the graph after an elapsed time of approximately 55 seconds. Note that this de-energizes the heating element 16 which then cools off to room temperature.

Similarly, in FIGURE 4, with the knob 20 again set at the 425° setting, the same situation applies. However, at 88 the sensing head heater 32 is broken or interrupted and power supply flows from the neutral N through the bimetal heater 30, the bridge heater 62 to a pair of parallel paths, one of which includes the protector heater 66, and the cycler heater 52, and then through the bimetal 68 and the heating element 16 until the heater 66 is effective to open the bimetal 68 to deenergize the heating element. As represented in FIGURE 4, approximately twenty-seven seconds has elapsed for the protector switch 68 to trip after the malfunction of the sensor heater 32. Both FIGURES 3 and 4 show the performance for simulated open circuit condition of both the heaters 32 and 52 on a dry pan test. Note in FIGURE 3 that the temperature rise when the heater 52 opens is approximately 110° maximum. In FIGURE 4 with the resistance 32 open, the rise occurring reaches only about 30°. Thus, it should be obvious that no dangerous overshoot temperatures are encountered with the fail-safe circuit of this invention.

While the embodiments of the present invention as herein disclosed, constitute preferred forms, it is to be understood that other forms might be adopted.

What is claimed is as follows:

1. In combination with an electrical cooking unit adaped to support a utensil, a power supply having first and second line conductors and a neutral, first bimetal actuated switch means in series with said first and second line conductors and said cooking unit and having a first heater in heat transfer relationship with said first bimetal for controlling said cooking unit in accordance with a predetermined temperature selection, second bimetal actuated switch means connected to said neutral in heat transfer relationship with said utensil and having a second heater in heat transfer relationship to said second bimetal, third bimetal actuated switch means having a third heater in heat transfer relationship with said third bimetal to open said third switch means when said third heater is heated, said third switch means connected in series with said first switch means, said first and second line conductors and said cooking unit, and a protector circuit for opening said third switch means when either of said first or second heaters is interrupted during the operation of said cooking unit, said protector circuit including a fourth heater and a fifth heater in series with said second and third switch means and in parallel with said first and second heaters, the resistance ratio of said fourth heater to said fifth heater being the same as the resistance ratio of said first heater to said second heater, said protector circuit including said third heater connected at one end to a point intermediate said first and second heaters and at the other end thereof to a point intermediate said fourth and fifth heaters, whereby to form an electrical bridge which is balanced when said first and second heaters are in operating condition to maintain said third heater substantially unheated and which is unbalanced when either of said first and second heaters is not in operating condition to heat said third heater and open said third switch means to deenergize said cooking unit.

2. The combination of claim 1 including means for resetting said third switch means to recondition said protector circuit for deenergizing said cooking unit.

3. In combination with an electrical heating unit adapted to support a workpiece, a power supply having first and second line conductors and a neutral, first bimetal switch means in series with said first and second line conductors and said heating unit and having a first heater in heat transfer relationship with said first bimetal for controlling said heating unit in accordance with a predetermined temperature selection, second bimetal switch means in heat transfer relationship with said workpiece and having a second heater in heat transfer relationship to said second bimetal, a third bimetal switch means having a third heater in heat transfer relationship with said third bimetal to open said third bimetal switch means when said third heater is heated, said third bimetal switch means connected in series with said first bimetal switch means, said first and second line conductors and said heating unit, and a protector circuit for opening said third bimetal switch means when either of said first or second heaters is inoperative during the operation of said heating unit, said protector circuit including a fourth heater and a fifth heater in series with said second and third bimetal switch means and in parallel with said first and second heaters, said protector circuit also including said third heater connected at one end to a point intermediate said first and second heaters and at the other end thereof to a point intermediate said fourth and fifth heaters, whereby to form an electrical bridge which is balanced when said first and second heaters are in operating condition to maintain said third heater substantially unheated and which is unbalanced when either of said first and second heaters is inoperative to heat said third heater and open said third bimetal switch means.

4. The combination of claim 3 wherein the ratio of said first heater to said second heater is the same as the ratio of said fourth heater to said fifth heater.

5. In combination with an electrical heating element, a first circuit including said heating element, a second circuit, means for sensing temperatures at said heating element including a first actuator means in said second circuit operative to energize and deenergize said second circuit, means in said first circuit for controlling electrical energy to said heating element and having a second actuator means in said second circuit operative to cause said control means to energize and deenergize said first circuit, a balanced electrical bridge circuit including said first actuator means in one portion thereof and said second actuator means in another portion thereof, and means responsive to the unbalance of said electrical bridge circuit for deenergizing said first circuit automatically whenever at least one of said actuator means is inoperative.

6. In combination with an electrical heating element, a high voltage circuit including said heating element, a low voltage circuit, means for sensing temperatures at said heating element including a first actuator means in said low voltage circuit operative to energize and deenergize said low voltage circuit, means in said high voltage circuit for controlling electrical energy to said heating element and having a second actuator means in said low voltage circuit operative to cause said control means to energize and deenergize said high voltage circuit, a balanced electrical bridge circuit including said first actuator means in one portion thereof and said second actuator means in another portion thereof, and means in said high voltage circuit responsive to the unbalance of said electrical bridge circuit for deenergizing said high voltage circuit automatically whenever at least one of said actuator means is inoperative.

7. A thermally responsive control arrangement for a first circuit having an electrical heating element comprising means for sensing temperatures at said heating element including a first actuator operative to energize and deenergize a second circuit, means in said first circuit for controlling electrical energy to said heating element including a second actuator in said second circuit operative to energize and deenergize said first circuit, and means for deenergizing said first circuit automatically whenever at least one of said actuators is inoperative, said last named means including a switch in said first circuit and an electrical bridge circuit including said actuators for opening said switch.

8. A thermally responsive control arrangement for a first circuit having an electrical heating element comprising means for sensing temperatures at said heating element including a first actuator operative to energize and deenergize a second circuit, means in said first circuit for controlling electrical energy to said heating element including a second actuator in said second circuit operative to energize and deenergize said first circuit, and means for deenergizing said first circuit automatically whenever at least one of said actuators is inoperative, said last named means including a switch in said first circuit and an electrical bridge circuit including said actuators for opening said switch, said bridge circuit including a pair of resistors having the same resistance ratio to each other as said actuators.

References Cited in the file of this patent
UNITED STATES PATENTS

| | | |
|---|---|---|
| 1,555,757 | Respondek | Sept. 29, 1925 |
| 2,479,319 | Crowley et al. | Aug. 16, 1949 |
| 2,754,399 | Edman | July 10, 1956 |
| 2,926,233 | Holtkamp | Feb. 23, 1960 |